April 14, 1925.
G. H. CLARK
1,533,972
CIRCUIT BREAKING TERMINAL
Filed Feb. 15, 1924
Fig. 1,
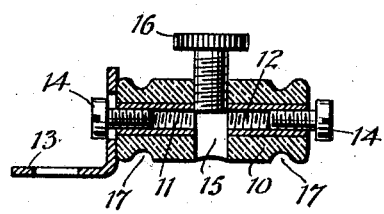
Fig. 2,
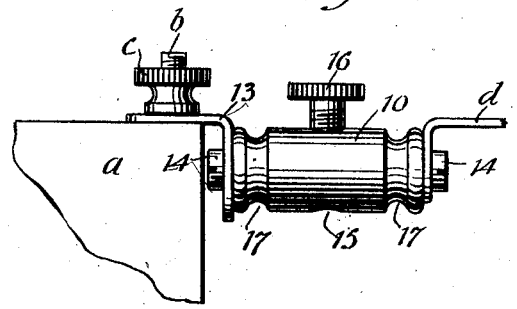
Fig. 3,
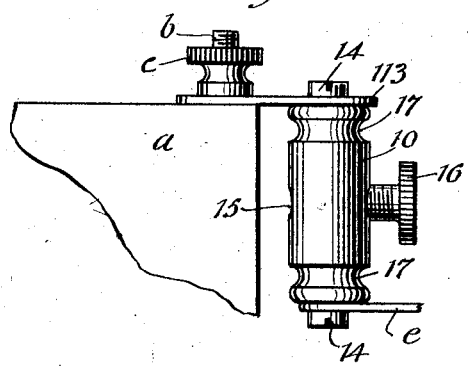
Fig. 4.
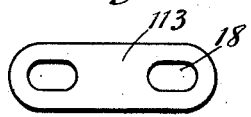
WITNESSES
Edw. Thorpe
J. L. McAuliffe
INVENTOR
George H. Clark
BY
ATTORNEYS Patented Apr. 14, 1925.

1,533,972

UNITED STATES PATENT OFFICE.

GEORGE H. CLARK, OF BROOKLYN, NEW YORK.

CIRCUIT-BREAKING TERMINAL.

Application filed February 15, 1924. Serial No. 693,045.

*To all whom it may concern:*

Be it known that I, GEORGE H. CLARK, a citizen of the United States of America, and a resident of the city of New York, borough of Brooklyn, in the county of Kings and State of New York, have invented new and Improved Circuit-Breaking Terminals, of which the following is a description.

My invention relates to a circuit breaker for low voltage circuits such as a battery circuit and relates more especially to a circuit breaker which although capable of other uses is particularly adapted for embodiment in a terminal by the use of which device the circuit may be readily broken to prevent losses, leaks, open grounds, etc., or to provide for disconnecting any part not needed at certain times as, for example, in radio sets.

The nature of the invention and its distinguishing features and advantages will clearly appear as the description proceeds.

Reference is to be had to the accompanying drawings forming a part of this specification, it being understood that the drawings are merely illustrative of one example of the invention.

Figure 1 is a longitudinal vertical section of a circuit breaker embodying my invention;

Figure 2 is an elevation of the circuit breaker as applied to a battery and its binding post;

Figure 3 is a view similar to Figure 2 but showing another manner of supporting the circuit breaker of a battery or other electrical apparatus;

Figure 4 is a plan view of a connecting element employed in the form shown in Figure 3.

In carrying out my invention in accordance with the illustrated example the circuit breaker is formed with a body 10, here shown as of general cylindrical form. Said body is formed with a throughbore 11 in which is tightly fitted internally threaded bushing elements 12. The outer ends of the bushing elements 12 are adapted to receive screws 14. The one screw 14 serves to hold a bracket 13 which may be angular as in Figures 1 and 2 or in the form of a straight bracket as indicated at 113 in Figures 3 and 4. The brackets 13 may be connected up with a battery *a* or other electrical apparatus, said bracket having holes in the ends thereof to receive the screws 14 and to fit over a binding post *b* to be held by a binding nut *c*. Thus, when applied to the battery as in Figures 2 or 3 the circuit breaker constitutes a terminal adapted to receive a conductor wire *d*, Figure 2, or conductor wire *e*, Figure 3.

A transverse bore 15 is produced in the body 10 and transecting the longitudinal bore 11 between the bushing elements 12 and said transverse bore is adapted to receive a screw 16 which serves to make or break the circuit between the opposed ends of the bushing elements 12. A slight turning movement of the screw 16 will cause it to bridge the space between the bushing elements 12 or to break the circuit between said elements. Thus, the bushing elements are utilized to receive the screws 14 for connecting up the body 10 with an electrical device and a conductor and at the same time the bushing elements are utilized as contacts through the medium of which the circuit is made or broken.

In order to adapt the body to be fastened to a wood cabinet or panel of a radio set or to other support, the body 10 is formed with annular grooves 17 by reason of which the body 10 may be fastened to a support by staples positioned in the grooves 17.

By the use of the above-described device a circuit at a terminal may be readily made or broken without disconnecting the conductor or conductors.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claim.

Having thus described my invention, I claim:

A circuit breaker comprising a body having a longitudinal throughbore, internally threaded bushing elements in said bore at the ends and spaced at their opposed ends, screws at the outer ends of the bushing elements and in threaded engagement therewith, said screws adapted to constitute binding posts for connecting up the circuit breaker, said body having a transverse longitudinal bore and a screw in said transverse bore adapted by turning movements to bridge the said bushing elements or to break the circuit between said elements.

GEORGE H. CLARK.